United States Patent

[11] 3,562,492

[72] Inventors Stan A. Kirkowski
Jersey City, N.J.,
Vincent Chan, San Pedro, Calif.; William V. Johnson, West Orange, N.J.

[21] Appl. No. 522,640
[22] Filed Jan. 24, 1966
[45] Patented Feb. 9, 1971

[73] Assignee The Western Union Telegraph Company
New York, N.Y.
a corporation of New York

[54] TAPE READER
7 Claims, 7 Drawing Figs.

[52] U.S. Cl. .......... 235/61.11, 200/46
[51] Int. Cl. .......... G06k 7/04, H01h 23/14
[50] Field of Search .......... 235/61.113, 61.11; 178/17; 200/46

[56] References Cited

UNITED STATES PATENTS

| | | | |
|---|---|---|---|
| 1,192,171 | 7/1916 | Dixon | 178/17 |
| 1,366,838 | 1/1921 | Rogers | 178/17 |
| 1,542,779 | 6/1925 | Peterman | 178/17 |
| 1,985,640 | 12/1934 | Kitchens | 178/17 |
| 2,345,289 | 3/1944 | Reiber | 235/61.11X |
| 2,384,194 | 9/1945 | Potts | 178/17 |
| 3,027,072 | 3/1962 | Levin et al. | 235/61.11(3) |

*Primary Examiner*—Daryl W. Cook

ABSTRACT: A tape reading device wherein a perforated tape travels in either direction upon a plurality of sensing star wheels. As the wheels penetrate the perforations in the tape, a circuit is energized causing signals to emanate. Associated therewith a motion sensing wheel penetrates the tape at equally spaced perforations so as to provide a continuous indication of the movement of the tape.

INVENTORS:
STAN A. KIRKOWSKI
WILLIAM V. JOHNSON
VINCENT CHAN
BY Michael D. Borsella
ATTORNEY.

INVENTORS:
STAN A. KIRKOWSKI
WILLIAM V. JOHNSON
VINCENT CHAN

BY Michael S. Borsella
ATTORNEY.

TAPE READER

The present invention relates to tape readers and particularly a high-speed reader adapted to sense perforations in a tape or similar record storing device.

The novel tape reader herein disclosed embodies amongst other features a sensing star wheel mechanism so disposed that either chad or chadless tapes may be sensed by the reader. Chads are the paper segments punched out of the tape to form the perforations therein when the paper tape is passed over a punch block and perforated by means of pins, in response to impulses or signals.

Chad tape is known in the art as tape containing perforations only, since the chads have been completely detached therefrom. Chadless tape on the other hand is tape wherein the chads have been punched therefrom to form the perforations, but remain loosely attached to the tape at some point along the edge of the perforation.

Similar tape readers in the prior art have been limited to chadless tape sensing.

The invention further contemplates utilizing in novel combination therewith a DC pulse-type motor capable of advancing the tape in either direction at relatively high speeds on the order of over 200 characters per second.

Briefly stated the invention provides a novel high-speed tape reading device comprising an alternately pulsed stepping motor driving a tape sprocket wheel which is attached to the shaft thereof. The sprocket wheel is capable of driving the tape in either direction above a plurality of sensing star wheels depending upon the number of channels in the tape. Each sensing wheel as it rides the underside of the tape has an associated resilient sensing lever tending to urge the wheel through the perforations in the tape. Movement of the wheel into the perforations causes the contact wires to engage a contact block thereby energizing a circuit and causing a signal to emanate.

In conjunction with the foregoing a motion sensing wheel similarly operable continuously penetrates the linear, equidistantly spaced star wheel perforations so as to emanate an impulse upon each step of the wheel and thereby give a continuous indication of the movement of the tape, while a tape lid latch holds the tape taut over the sensing star wheels and embodies a stopping safety mechanism capable of switching off the motor if the tape is pulled too tightly. The end of the tape is signalled by a sensing pin which rides the upper edge of the tape and is continuously depressed to keep the motor circuit energized. At the end of a tape or torn tape, the pin rises to stop the motor.

Accordingly it is an object of the present invention to provide a tape sensing device of the above indicated nature and to do so in a novel and effective manner.

Another object of the invention is to provide a novel tape reader in combination with a short-response pulse-type motor capable of advancing the tape at high speeds in either direction.

Still another object of the invention is to provide a novel tape reader of the above-indicated nature capable of reading both chad and chadless tape.

Another object of the invention is to provide a high-speed tape reader embodying automatic stopping means when the tap becomes too tight.

Still another object is to provide a novel tape reader embodying means for automatically signalling a stoppage of the tape.

Another object of the invention is to provide a high-speed tape reader embodying means for automatically stopping the advance mechanism when the end of the tape is reached or the tape is broken.

Other objects and advantages will become more apparent hereinafter by a consideration of the detailed description which follows taken together with the accompanying drawings wherein one embodiment of the invention is illustrated and described by way of example. It is to be expressly understood, however, that the drawings are for the purposes of illustration only and are not to be construed as defining or limiting the invention, reference being had for this purpose to the appended claims.

In the drawings wherein like reference characters indicate like parts.

Figure 1:
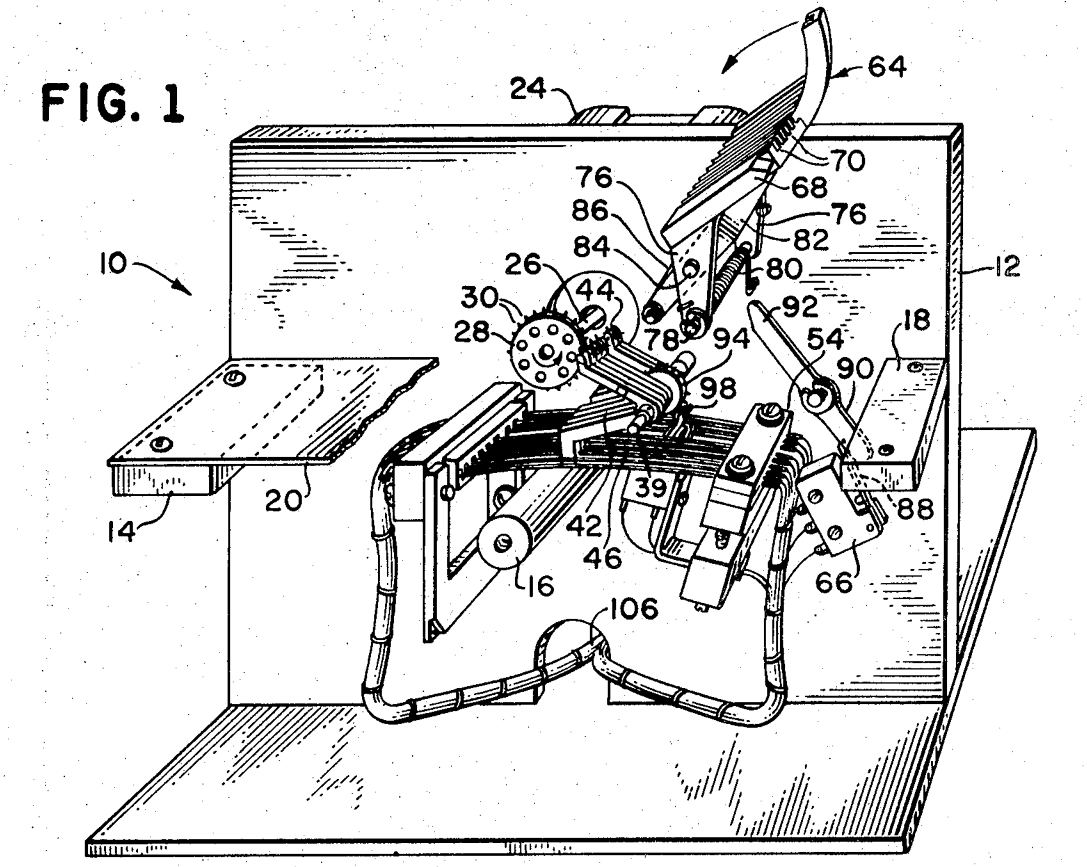
FIG. 1 is a perspective view of the novel tape reader of this invention.

Referring now to the drawings and more particularly to FIG. 1 there is shown a complete tape reading assembly generally designated by the numeral 10, mounted substantially upon a vertical mounting wall 12 which in turn supports mounting posts 14, 16 and 18. A guiding platform 20 (FIGS. 1 and 2) is supported between the posts 14 and 18, and is adapted to carry a typical tape 22.

On the vertical mounting wall 12 there is mounted in any approved manner, a short response time DC pulse motor 24, of a type well known in the art, and a motor shaft 26 thereof has a sprocket wheel, herein sometimes called feed wheel, 28 secured to the end. The motor 24 is positioned in such a manner with respect to the guiding platform 20 and the tape 22 that a series of peripheral teeth 30 on the sprocket wheel protrude through a slot 32 for the purpose in the platform 20, (FIG. 3) and pick up or engage, a series of equidistant, linearly disposed tape feed holes 34. Thus as the stepping motor shaft rotates, it advances the tape 22 by means of the feed sprocket wheel fastened to the shaft. The motor will make a number of discrete steps per revolution so that each step, each of the teeth 30 will be advanced a number of degrees corresponding, or equivalent to the distance between any two feed holes.

A second slot 36 transversely disposed in the platform 30 enables a plurality of identical sensing assemblies 38 also mounted on the wall 12, as by a mounting shaft 39, to protrude through the guiding platform 20 and sense the perforations 40 in the tape 22, as the tape is advanced along the platform 20 over the slot 36.

The sensing assemblies 38 (FIGS. 4 and 5) comprise essentially a V-shaped lever 42 having a star sensing wheel 44 rotatable on one end thereof and the opposite end is attached to a contact lever 46. The sensing assembly 38 itself is rotatable about the shaft 39 thereby causing the contact lever 46 to connect a lead 48 to either post 50 or 52 according to the position of the star sensing wheel 44 as hereinafter explained.

Since the reader 10 is adaptable to read either a 5, 6, 7, or 8-channel tape in either a unidirectional or bidirectional mode, the actual number of sensing assemblies mounted upon the shaft 39 will depend upon the number of channels to be sensed, one sensing assembly being required for each channel. The actual sensing operation is performed as follows: As the tape 22 is advanced in small rapid increments by the motor 24 over the sensing star wheels 44, the star wheels ride the underside of the tape in contact therewith due to the upwards biasing force of the contact levers 46 which are of springlike resilient material and are anchored in cantilever fashion into an anchor block 54. Each star wheel embodies a plurality of slender arms 56 on the end adapted to penetrate and enter into the perforations 40 in the tape. The star wheel and arms are rotatable about an integral axle 58. As the tape slides over the star wheels, each wheel rides the underside of the tape on two of its arms 56. When a no-hole condition is sensed (FIG. 5) the movable contact levers are switched to the lower contact 50. When a hole 40 passes over the star wheel and is sensed, one of the star wheel arms 56 is pushed upward through the hole (FIG. 4) and the contact lever 46 is switched towards the contact 52 thereby transmitting an impulse to the circuitry logic (not shown here) of the reader. Therefore the connection to the upper contact 52 signifies transmittal of some piece of intelligence whereby connection to the lower contact 50 signifies merely a blank space.

Figure 3:
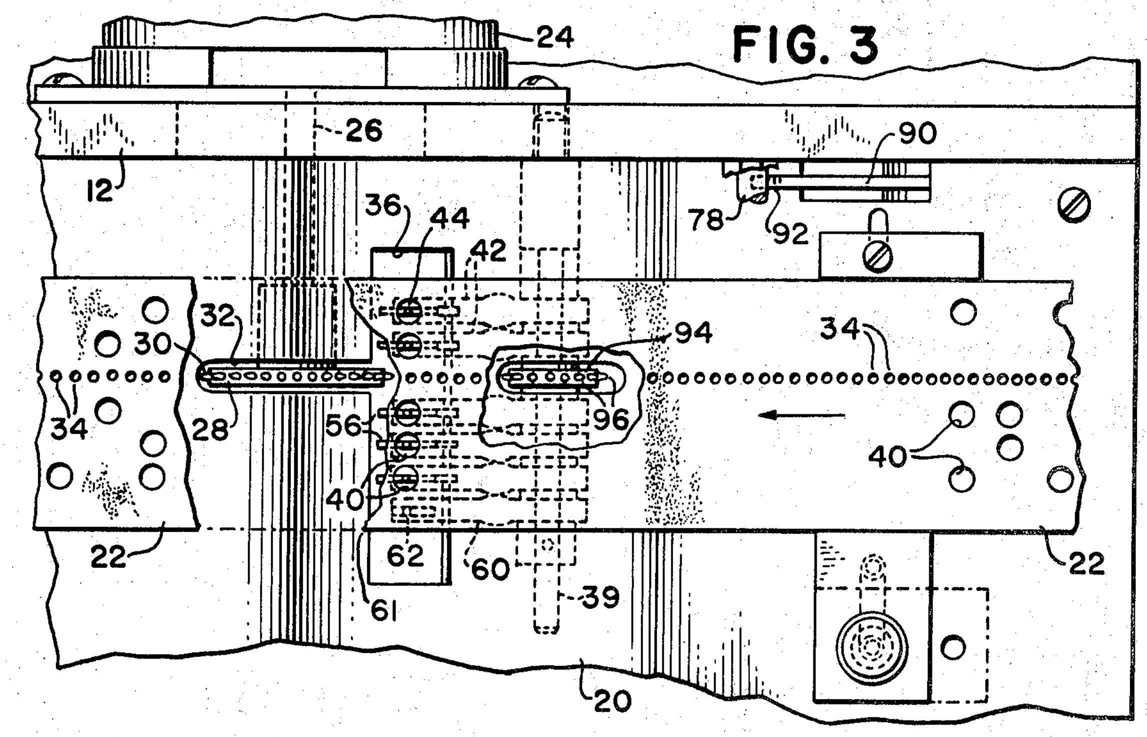
FIG. 3 is a plan view of the sensing mechanism of the invention.
Figure 4:
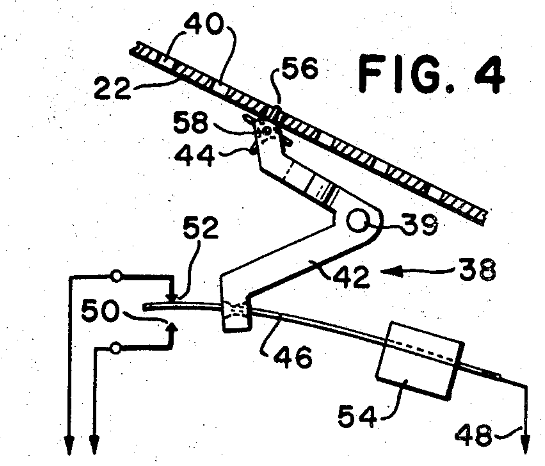
FIG. 4 is a schematic view of a typical sensing device for any one channel in the tape, in a signal transmitting position.
Figure 5:
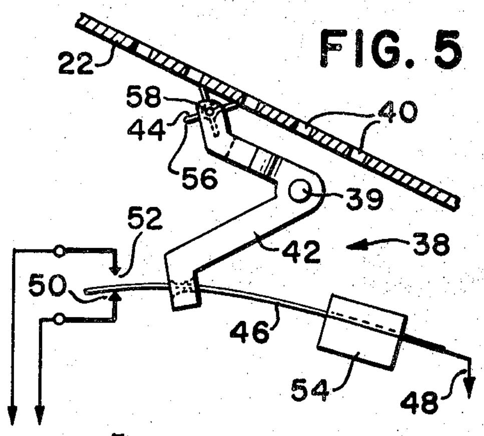
FIG. 5 is the device of FIG. 4 but in a nontransmitting position.

In conjunction with the foregoing a similar sensing lever 60 (FIGS. 2 and 3) rides the underside of the edge 61 of the tape 22. The sensing lever 60 does not sense any perforations in the tape but is for the express purpose of detecting the end of the tape and is sometimes called the tape-out lever. The tape-out lever is equipped with a tape-out pin 62 on the end thereof instead of a star wheel which is ordinarily biased upwards against the tape 22 when the tape is travelling, but is resisted by the tension in the tape so that its associated contact lever is in the lower contact position shown in FIG. 5 wherein the contact 50 is connected to the contact 48. In this position the circuit for the stepping motor 24 is closed for the stepping motor to be driven. When the end of the tape passes over the tape-out lever 60, and the lever is no longer restrained by the tension in the tape, the resilient associated contact lever being upwardly biased, will engage the contact 52 as shown in FIG. 4, thereby opening the motor circuit to automatically stop the motor 24. The same end will be accomplished in the event of an accidental breaking of the tape 22.

Figure 2:
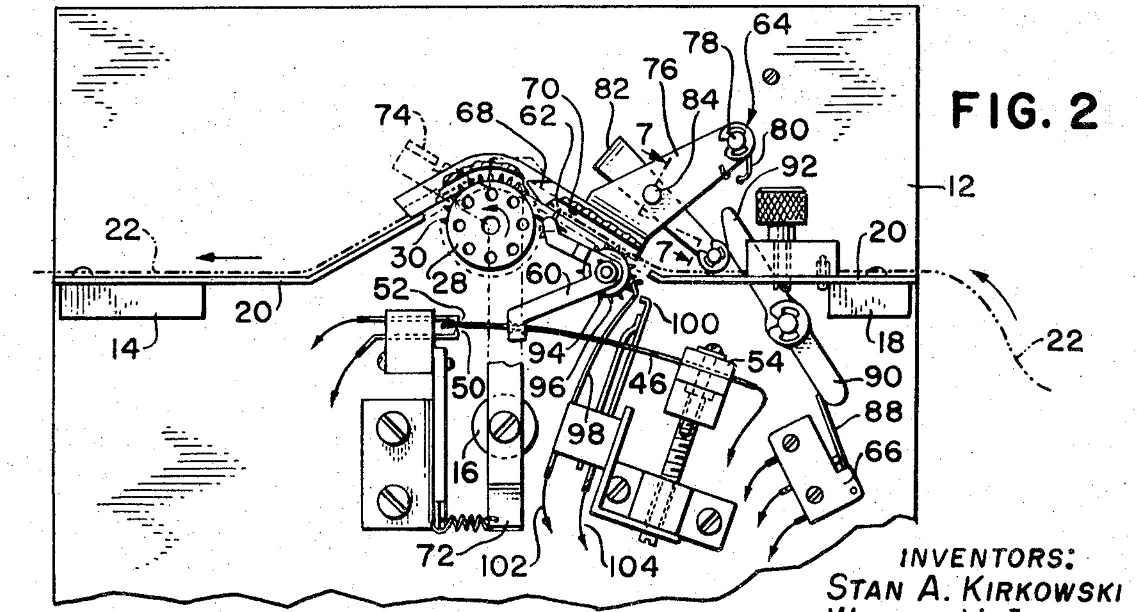
FIG. 2 is a front view of the mechanism of FIG. 1 showing the path of the tape.
Figures 6, 7:
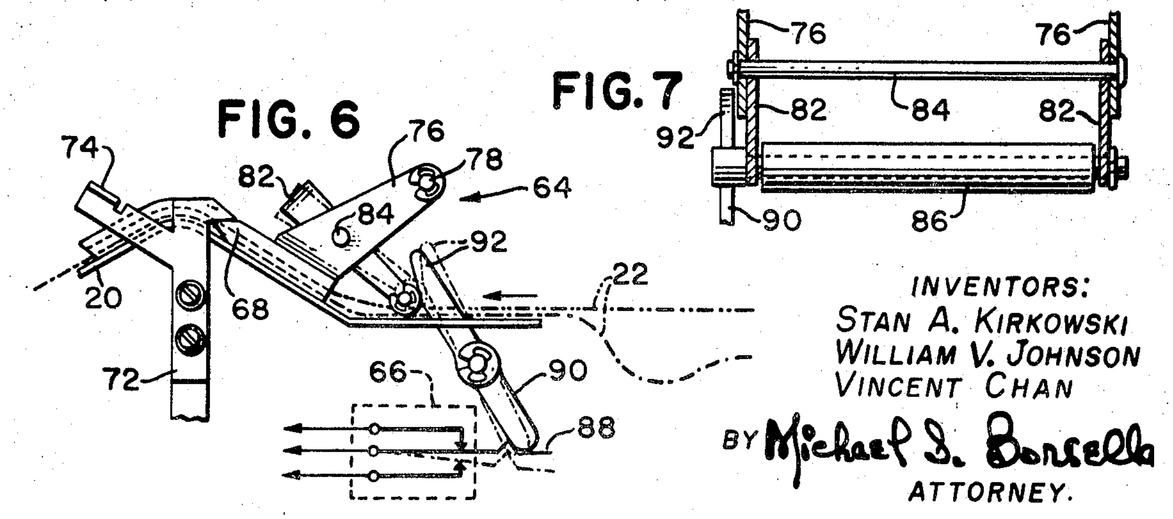
FIG. 6 is a side view of the tight tape stop assembly of the invention.
FIG. 7 is a section view taken the the line 7–7 of FIG. 2.

Means are now provided in combination with the above, for stopping the stepping motor 24 wherever the tape 22 becomes too tight and might possible break. Referring to FIGS. 1, 2, and 6, there is shown a tape lid latch assembly 64 adapted to operate a tight tape switch 66 which is connected in series with the tape-out motor circuit so that the stepping motor will stop whenever the tension in the tape becomes excessive and a tight tape condition occurs. The latch assembly 64 embodies a lid 68 adapted to clamp loosely over the tape 22 as it advances through the reader. A series of parallel open slots 70 in the lid enable the sprocket wheel 28 as well as the various star wheels 44 to protrude therethrough and thus operate in an unimpeded manner. The lid 68 is maintained in closed position over the tape by means of a spring latch 72, readily releasable by a lever handle 74 (FIG. 6). The tape lid latch assembly 64 further embodies a boxlike frame 76 which supports the lid 68 and mounts on a post 78 within a torsion spring 80 so that when the lever handle 74 is depressed the entire tape lid latch assembly 64 is lifted upwards above and clear of the tape, (FIG. 1). A U-shaped roller bracket 82 is mounted in the frame 76 (FIGS. 1, 2 and 6) by means of a pivot rod 84 and supports a roller 86 (FIG. 7) which rides on top of the tape 22 (FIG. 6). The roller 86 is held lightly against the top of the tape by means of the biasing force of a spring contact 88 of the switch 86 exerted against a pivot bar 90 having one end 92 bearing against the roller 86 (FIG. 2). When the tape 22 becomes excessively taut so that breakage might occur, the increased tension in the tape causes the roller 86 to lift upwards and pivot about the pivot rod 84 whereupon the pivot bar 90 depresses the spring contact 88 so that the switch 66 will stop the stepping motor 24.

Means are also provided to insure that the tape 22 is in effect continuously advancing through the tape reader 10, and to immediately signal any stoppage of the tape. Referring to FIGS. 1, 2, and 3, there is shown a motion sensing wheel 94, colinearly located with the feed wheel 28 (FIG. 3). The motion sensing wheel 94 is in effect a relatively smaller sprocket wheel, and the sprockets 96 thereof are adapted to pick up and penetrate the feed holes 34 in the tape 22. The motion sensing wheel 94 is advanced an increment by each successive feed hole 34 and in so doing a motion sensing contact lever 98 (FIG. 2) is caused to intermittently contact a terminal 100. Hence the terminal 100 is contacted once for each feed hole 34 that passes over the sensing sprocket wheel 94, to thereby connect motion sensing leads 102 and 104 which in turn are connected to the circuitry logic of the system (not shown here) (FIG. 2). Therefore a steady stream of impulses is directed to the circuitry logic, which if interrupted will signal that the tape 22 is not advancing.

The various components of the invention such as switches, levers, posts, sensing means and the like are mounted to the wall 12 in any approved manner and the conductors therefrom harnessed as by harness 106 leading to the logic of the system.

It will be noted that since the sensing star wheels are positioned on the underside of the tape and protrude up into the perforations in the tape, the tape reader is adapted to read both chad and chadless tape, since the chads which are generally positioned in the top side of the tape do not in this manner interfere with the penetration of the sensing star wheels into the perforations.

The DC stepping motor is automatically detented after each pulse and provides a high-speed operation for the reader. At such revolving of the motor shaft although appearing continuous is actually a series of discrete steps. Hence the motor may reverse its direction with a minimum of inertia and the tape may be read in either direction.

Although only one embodiment of the invention has been illustrated and described, it will be apparent to those skilled in the art that modifications may be made, and changes in the relative arrangement of the parts without departing from the spirit and the scope of the invention.

We claim:

1. A tape reader for reading the data on a multichannel perforated tape comprising, means for supporting the tape, a motor for advancing the tape, a plurality of sensing assemblies movable by the perforations in the tape, a plurality of contact levers operable by the movement of said assemblies, sensing means responsive to tension in the tape for signalling the end of the tape, means for stopping the motor, including a tape lid and a supporting frame therefor and a roller bracket pivotable in the frame having a roller mounted thereon riding the tape, a switch in series with said motor associated with the bracket having a resilient contact for biasing the roller against the tape, said switch being adapted to open the motor circuit when the tension in the tape overcomes the resilient force of said contact, and means emitting a steady stream of impulses for signalling the continuous advance of the tape through the reader.

2. The tape reader claimed in claim 1 wherein said motor is a DC pulse-type stepping motor and is operable in either direction.

3. The tape reader claimed in claim 1, wherein the means for supporting the tape comprise a guiding platform having a slot therein and said sensing assemblies are biased upwards through the slot against the tape to penetrate the perforations in the tape.

4. The tape reader claimed in claim 1, wherein said sensing assemblies comprise, a lever, a sensing star wheel on one end of said lever having a plurality of arms, and attached to a contact lever on the opposite end for biasing the arms into the perforations in the tape to allow the contact lever to complete an impulse transmitting circuit thereby.

5. The tape reader claimed in claim 1, wherein said means emitting a steady stream of impulses for signalling the continuous advance of the tape through the reader comprise, a motion sensing wheel driven in steady increments by the tape, and a contact lever actuated by said wheel adapted to engage a terminal each time the tape advances one increment.

6. The tape reader claimed in claim 1, wherein said tape is chadless tape.

7. The tape reader claimed in claim 1, wherein said tape is chad tape.